Sept. 22, 1936.  R. J. BURROWS ET AL  2,054,804
WHEEL
Filed Nov. 25, 1933     4 Sheets-Sheet 1

Fig.1.

Inventors:
Robert J. Burrows
Alfred O. Williams
By Brown, Jackson, Boettcher & Dienner.
Attys.

Sept. 22, 1936.    R. J. BURROWS ET AL    2,054,804
WHEEL
Filed Nov. 25, 1933    4 Sheets-Sheet 3

Inventors:
Robert J. Burrows
Alfred O. Williams
By Brown, Jackson, Boettcher & Dienner
Att'ys.

Sept. 22, 1936.  R. J. BURROWS ET AL  2,054,804
WHEEL
Filed Nov. 25, 1933  4 Sheets-Sheet 4

Fig. 5.

Inventors:
Robert J. Burrows
Alfred O. Williams
By: Brown, Jackson
Boettcher & Dienner
Attys.

Patented Sept. 22, 1936

2,054,804

UNITED STATES PATENT OFFICE 2,054,804

WHEEL

Robert J. Burrows and Alfred O. Williams, Battle Creek, Mich., assignors to Clark Tructractor Company, Battle Creek, Mich., a corporation of Michigan Application November 25, 1933, Serial No. 699,700

22 Claims. (Cl. 295—11)

This application is a continuation-in-part of our co-pending application, Serial No. 656,906, filed February 15, 1933.

The present invention relates generally to wheels and is more particularly concerned with certain improvements in resilient railroad car wheels of the type which utilize the strength of cushioning material, such as rubber or the like, in shear for taking radial loads and which contemplates placing the resilient material under compression to resist lateral thrusts on the wheel and to effectively and frictionally secure the side faces of the resilient rubber inserts to the rim and wheel body to provide the relative movement required therebetween to secure the proper cushioning effect. In this connection, the present invention is a modification of the wheel disclosed in our co-pending application, Serial No. 634,304, filed September 22, 1932, and entitled "Wheel."

The principal object of the present invention is the provision of an improved resilient wheel in which the rim is insulated entirely from the wheel body by cushioning means acting under lateral compression to take all radial loads in shear.

Another object of the present invention is the provision of a wheel body with a separate rim attached thereto and provided with flanges which are frictionally clamped to the wheel body by interposed annular rubber discs which, by virtue of their resiliency and particularly by their strength in shear, provide for the cushioning of road shocks and the like. Another object of the present invention is the provision of a wheel body having two or more wheel discs, on each side of each of which is disposed a rubber ring frictionally clamped thereagainst by means preferably carried by the rim of the wheel and substantially flush therewith. Still further, another object of the present invention is the provision of structure by which the compressive stresses imposed upon the rubber discs are kept uniform and below a predetermined maximum.

A further object of the present invention is to provide a cushioned wheel of inexpensive construction and of relatively light weight whereby more rapid acceleration and deceleration can be secured. A still further object of the present invention is to provide for uniform compression of the cushioning rings by means which allows the use of comparatively lightweight parts.

These and other objects of the present invention will be apparent to those skilled in the art after a consideration of the following detailed description of the preferred structural embodiment, taken in conjunction with the accompanying drawings, in which:—

Figure 1:
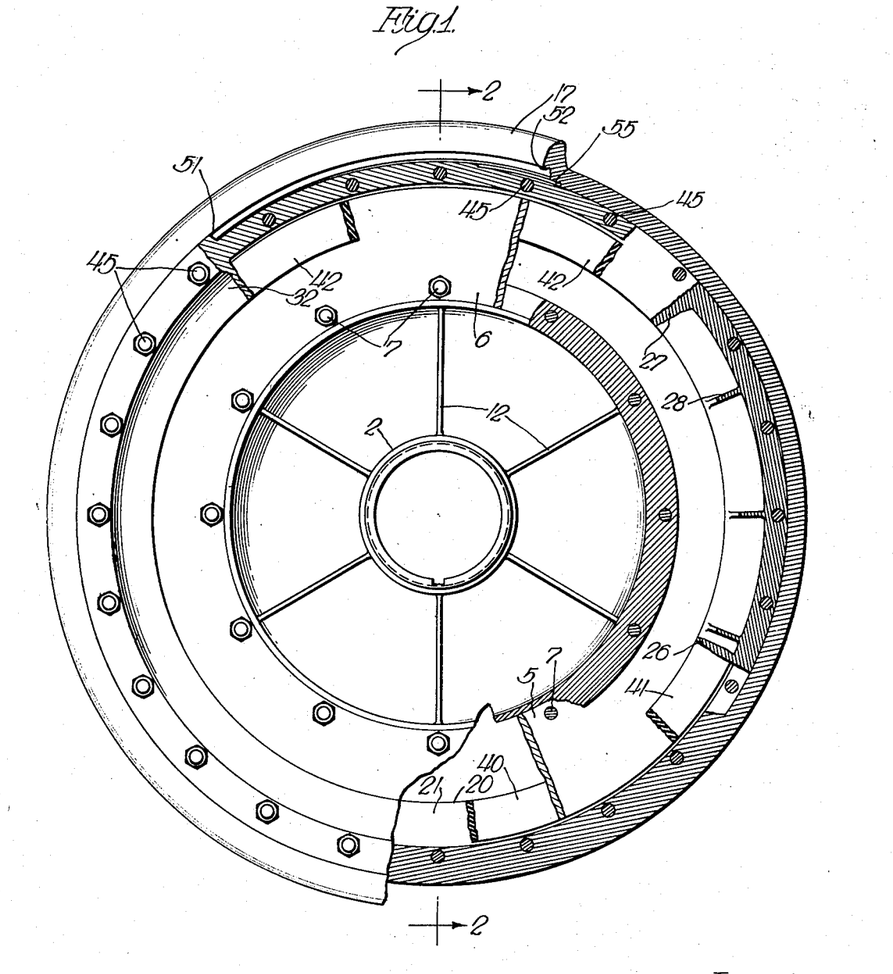
Figure 1 is an elevation of a wheel, certain parts being broken away, looking toward the inside flange side of the wheel.
Figure 2:
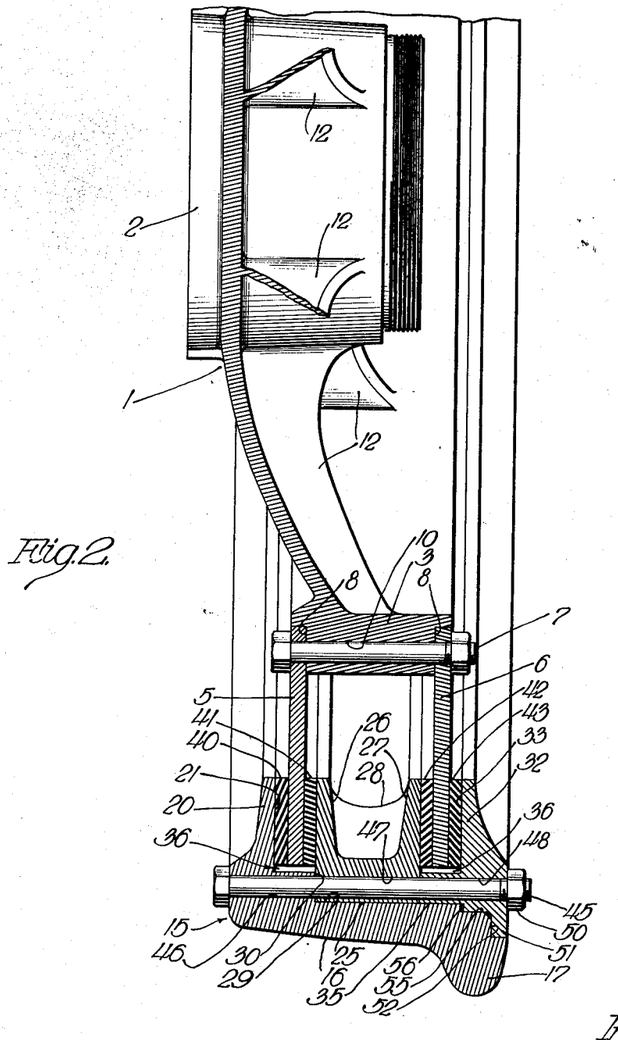
Figure 2 is a fragmentary cross-section, taken approximately along the line 2—2 of Figure 1.

Referring now to the drawings, the reference numeral 1 indicates a central wheel body in the form of a disc or spider having a hub 2 and a drum section 3 to which a pair of axially spaced planar wheel discs 5 and 6 are bolted, as by a plurality of bolts 7, the section 3 and discs 5 and 6 serving as a radially outwardly directed flange. While we have shown both of the discs or plates 5 and 6 as detachable from the central wheel body 3, it is necessary that only one be detachable. The discs 5 and 6 have a limited amount of lateral flexibility, for reasons which will appear later. The drum section 3 is provided with the proper grooves 8 to receive and axially align the wheel discs 5 and 6 and with the proper openings 10 to receive the bolts 7. The web portion of the wheel body 1 is suitably reenforced by a plurality of radial ribs 12 which are preferably cast integrally with the wheel body and extend from the drum section 3 radially inwardly to the hub 2 of the wheel body.

The rim or tire of the wheel is indicated by the reference numeral 15, and in the illustrated construction it will be seen that the rim shown is of the form used for rail cars and the like having the usual beveled tread 16 and a rail flange 17. The rim 15 also carries a radially inwardly extending flange or ring 20 which, as best shown in Figure 2 may be but is not necessarily formed integrally with the rim 15. The laterally inner surface 21 of the flange 20 lies in a plane parallel with respect to the general plane of the wheel and the general arrangement of the wheel body and rim is such that the planar surface 21 is spaced a short distance from the outer surface of the wheel disc 5, which latter surface is also parallel with respect to the general plane of the wheel.

A filler or spacer ring 25 is disposed substantially midway between the wheel discs 5 and 6 and midway between the edges of the wheel rim 15. The filler ring 25 includes oppositely disposed side walls 26 and 27 connected together by a plurality of ribs 28. The rim 15 is formed with a groove 29 on the inner surface thereof to receive the filler ring 25 and with a shoulder 30 adjacent the flange 20. The filler ring 25 is adapted to be seated in the groove 29 against the shoulder 30 when the wheel is properly assembled.

On the flange side of the wheel and the rim 15 there is a separable flange or ring 32 which has a planar surface 33 corresponding generally to the surface 21 formed on the flange 20 at the other side of the rim. Like the sections 3, 5, and 6, the rim 15 and the flanges 20, 26 and 27, 32 form or serve as a pair of axially spaced inwardly directed channels. The flange 32 is also provided with a laterally inwardly extending abutment portion 35, the inner margin of which is adapted to contact with the filler ring 25 opposite the shoulder 30.

The diameter of the abutment portion 35 and the diameter of the rim 15 adjacent the shoulder 30 are slightly greater than the diameters of the two wheel discs 5 and 6, as indicated by the reference numeral 36 in Figure 2. These spaces 36, therefore, provide for a limited amount of relative movement between the rim and wheel body in a direction lying in the general plane of the wheel. For cushioning this movement and for effectively transmitting the loads from the wheel body to the rim, the present invention contemplates providing a plurality of annular resilient members in the form of rubber discs interposed between the wheel discs 5 and 6 and the filler ring on the inner sides of the wheel discs and the rim flanges at the outer sides thereof, these resilient members being firmly clamped against the wheel discs in a lateral direction. The rubber discs 40 and 41 are disposed on opposite sides of the wheel disc 5. The member 40 is disposed between the surface 21 on the flange 20 and the laterally outer side of the wheel disc 5 while the resilient member 41 is disposed between the wall 26 of the filler ring 25 and the inner face of the wheel disc 5. On the other side of the wheel, the rubber member 42 is disposed between the wall 27 of the filler member 25 and the inner face of the other wheel disc 6 while the rubber disc 43 is disposed between the inner face 33 of the movable flange 32 and the outer face of the wheel disc 6. If desired, the faces of the flanges 20 and 26 and the filler or spacer ring 25 engaged by the rubber discs may be knurled to secure a firm contact.

The flange 32 serves as a clamping ring to apply compressive stresses to all of the resilient rubber members, a plurality of bolts 45 being provided to effectively clamp the flange ring 32 in place. These bolts pass through openings 46 formed in the base of the flange 20 adjacent the shoulder 30, through registering openings 47 formed in the filler ring 25 and registering openings 48 formed in the abutment portion 35 of the movable flange or clamping ring 32.

After the parts have been assembled in the relation shown in Figure 2, the nuts 50 on the bolts 45 are tightened, drawing the ring 32 against the rubber member 43 and the wheel disc 6 against the rubber member 42. Similarly, this clamping pressure is transmitted by virtue of the filler ring 26 against the rubber member 41 which bears against the inner face of the wheel disc 5, the outer face of the disc 5 bearing against the rubber member 40 which in turn transmits its pressure to the flange 20 formed integrally on the rim 15. The filler ring 25 is capable of lateral movement with respect to the rim 15 until the wall 26 comes into contact with the shoulder 30. Likewise, the clamping ring 32 is capable of lateral movement with respect to the filler ring 25 until the abutment portion 35 of the clamping ring contacts with the wall 27 of the filler ring. These portions are accurately dimensioned so that, when all of the parts have been completely tightened, all of the resilient rubber members 40, 41, 42, and 43 are subjected to substantially the same amount of lateral compression.

The position of the shoulder 30, the thickness in a lateral direction of the filler ring 25 and the dimension of the abutment portion 35 on the clamping ring determine the intensity of clamping pressure applied to the rubber members. These parts therefore serve as a limit to the amount of lateral compression which can be imposed on the rubber members, no matter how tight the nuts 50 may be drawn. If desired, the clamping ring 32 may be provided with a radially outwardly disposed flange 51 seating in a groove or recess 52 formed in the flange side of the rim 15 for also limiting the inward movement of the clamping ring 32 which, as will be understood, also limits the amount of compression which can be placed on the rubber discs. It is desirable, also, to guide the flange ring 32 in its clamping movement, and in the present invention this is accomplished by virtue of the groove 55 formed on the clamping ring 32. Preferably, as indicated in Figure 2, the groove 55 has a depth in excess of the guiding portion 56 on the flange ring 32 so that the ring will not bottom in the recess or groove 55.

The wheel as described above will be assembled in suitable jigs or other tools by which all of the component parts are accurately held in axial alignment in the position shown in Figure 2 during the tightening of the clamping and retaining bolts.

It will be observed that the planes of the several annular resilient members 40 to 43 are parallel with respect to the general plane of the wheel and are disposed normal with respect to the axis thereof. Thus, all radial loads imposed on the wheel are transmitted from the wheel discs 5 and 6 to the rim 15 by the strength of the rubber members in shear. These rubber members effectively cushion all road shocks transmitted to the wheel in a radial direction, while these same members resist lateral thrusts imposed on the wheel by acting in compression. It is important to note that, while the rubber cushioning members are arranged so as to resist radial loads by virtue of their strength in shear, the rubber members are uniformly stressed throughout. Within the limits defined by the dimensions of the spaces 36 in a radial direction, the relative movements between the rim 15 and the wheel body 1 provide for the effective cushioning of all road shocks imposed on the wheel in a radial direction or any radial components thereof. It is also to be noted that, even if the rubber members should entirely fail, the wheel body 1 would drop only a small amount relative to the rim. In addition, the rim 15 can not become detached from the wheel body by the failure of the rubber cushioning members.

Due to the relatively great extent of area of contact between the plurality of rubber cushioning members and both sides of both of the wheel discs 5 and 6, a relatively small amount of lateral compression imposed on the rubber cushioning members is sufficient to withstand all normal radial loads. The provision of two pairs of cushioning members, disposed adjacent opposite edges of the rim, produces a wheel which is exceptionally rigid as far as eccentric and radial loads are concerned, but yet which is, by virtue of the uniform and continuous loading of the annular rubber members in shear, extraordinarily effective in cushioning road shocks.

While, as mentioned above, the difference between the external diameter of the wheel discs 5 and 6 and the internal diameter of the tire of rim member 16, represented by the spaces 36, is such that the desired relative movement between the wheel body 1 and the tire 16 is permitted, it will nevertheless be noted that should the rubber discs fail, the wheel is still a safe wheel, for none of the parts would become separated and the only thing that would occur would be that the two wheel discs would ride on the rim. The wheel could be used a considerable length of time in this condition so that the car could be run to a terminal point where the wheel could be changed, and such operation of the wheel would not damage any part of the wheel or car, nor would its operation as outlined be dangerous.

It is further to be considered that a greater or smaller number of wheel discs and associated rubber discs may be employed according to the loads and other factors for which the wheel may be designed.

We consider it desirable that the wheel discs 5 and 6, or at least one of them, shall be separable from the wheel body to provide for the assembly of the various units, and it is also desirable that the inside diameter of the wheel discs shall be considerably smaller than the outside diameter to provide some flexibility in the two discs so that, in bolting up the complete assembly with the plurality of rim bolts 45, uniform compression is obtained on all of the rubber discs. This feature of lateral flexibility of the discs 5 and 6 is of considerable practical importance because it is impossible, in production, to machine all of these shoulders and mutually engaging surfaces of the wheel so accurately that when assembly is made a uniform pressure would be obtained on all of the rubber discs. The ability of the wheel discs 5 and 6 to spring or yield laterally is therefore of considerable importance in accommodating manufacturing inaccuracies.

Also, it is to be noted that the rim is completely insulated from the wheel body so that there is no metal-to-metal contact between any of the parts. In this connection the space 36 is of importance in addition to its function of permitting relative movement between the wheel body and rim in a radial direction. A wheel of the completely insulated type is especially useful in connection with cars embodying signaling systems of the type disclosed in our co-pending application, Serial No. 636,676, filed October 7, 1932.

Figure 3:
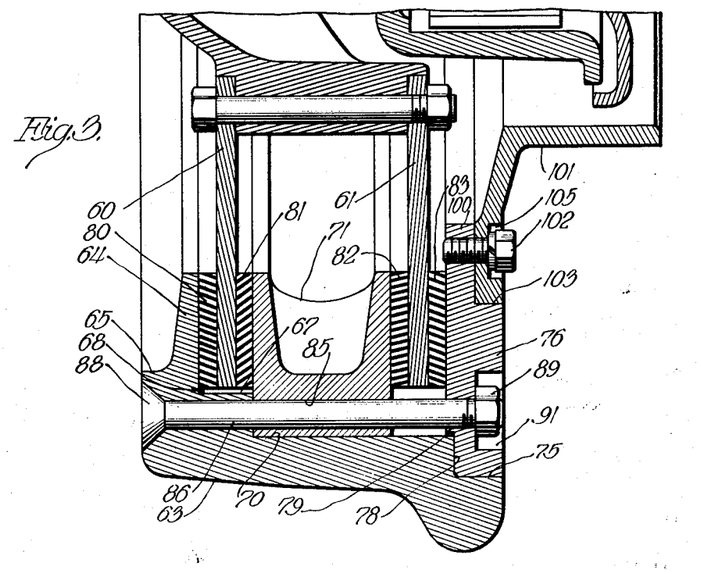
Figures 3 and 4 are sections similar to Figure 2 but showing slightly different forms of wheels.

Figure 3 illustrates a form of construction which is somewhat simpler in certain respects than the form shown in Figs. 1 and 2 and described above. In this form the reference numerals 60 and 61 indicate the two wheel discs which correspond to wheel discs 5 and 6 shown in Figs. 1 and 2. Surrounding and embracing the periphery of the wheel discs 60 and 61 is a rim or tire 63 having at one side an integral flange or ring 64 extending radially inwardly from the body of the rim. Preferably as shown, the flange or ring 64 is disposed a small distance laterally inwardly from the edge of the rim 63, leaving a thickened portion 65 serving as the laterally outer margin of the rim or tire 63.

Disposed laterally inwardly of the flange ring 64 is a ledge or shoulder 67 having an internal diameter slightly in excess of the external diameter of the wheel disc 60, thereby providing a space 68 to accommodate the relative movement between the wheel body and the rim.

The rib 63 is recessed, as indicated by the reference numeral 70, to provide a groove or channel to receive a filler or spacer ring 71 similar to or identical with the filler ring 25 illustrated in Figure 2. The filler ring 71 serves as a spacer between the wheel discs 60 and 61, as will be described later, and abuts against the laterally inner edge of the shoulder 67 when the wheel is assembled.

On the flange side of the rim 63 a groove or recess 75 is provided and is adapted to receive a clamping flange or ring 76. The groove or channel 75 has an internal diameter in excess of the internal diameter of the groove 70 receiving the spacer 71, as will be clear from Figure 3. This construction provides a shoulder 78 against which the clamping ring or flange 76 is adapted to be drawn. The flange ring 76 is provided with a small shoulder 79 serving to guide the movement of the ring 76 when the bolts are tightened, but the abutment flange 35, shown in Figure 2, has been omitted.

Rubber cushioning rings 80, 81, 82, and 83 are provided, these rubber members being disposed in substantially the same manner that the rubber rings 40, 41, 42, and 43 are disposed in the construction illustrated in Figure 2, that is, there is a rubber cushion ring disposed between each side of each of the wheel discs and the adjacent rim flange or spacer. Preferably, the internal diameters of the rubber cushioning rings are equal to the internal diameter of the flange ring 64 and the spacing ring 71, although this is not essential. The spacer 71 is provided with a plurality of openings 85 to receive clamping bolts 86. These bolts have countersunk heads 88 substantially flush with the edge 65 of the rim, and the nuts 89 of the bolts 86 are disposed within recesses or countersinks 91, so that the outer threaded end of the bolt 86 is substantially flush with the flange side of the rim. The rim or the flange ring 64 and the clamping ring 76 are, of course, provided with suitable openings for receiving the bolts 86. The shoulders 67 and 78 are accurately dimensioned, so that when the flange ring 76 is firmly tightened against the shoulder 78 the spacing ring 71 is in engagement with the shoulder 67 and substantially uniform pressure in a lateral direction is imposed on the several rubber cushioning members.

The detachable flange ring 76 is extended radially inwardly, as at 100, to a correspondingly greater extent than the integral flange ring 64 for the purpose of providing for the attachment of a collector ring 101, by means such as cap screws 102. The collector ring 101, by being secured to the flange ring 76, which, in turn, is connected directly with the rim 63 of the wheel, is in direct electrical connection with the rails when the car is in operation. The collector ring forms a part of the invention shown and claimed in the co-pending application of Alfred O. Williams, filed March 3, 1933, for Signal means for rail car, bearing Serial Number 659,517. Preferably, the flange ring 76 is grooved, as at 103, to receive the collector ring 101, the latter being provided with recesses or countersinks 105 to receive the heads of the cap screws 102 so that these members, like the clamping bolts 86, terminate substantially flush with the lateral surfaces of the wheel.

Figure 4:
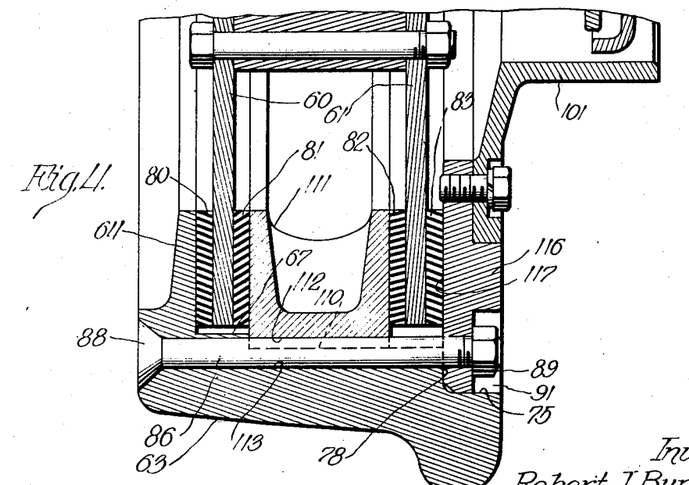

In Figure 4 we have shown a somewhat simpler form of wheel in which the rim 63 is provided with a groove or channel 110 which is more shallow than the groove or channel 70 shown in Figure 3, and the spacing ring 111 is correspondingly smaller as regards its outer diameter than the spacing ring 71 of Fig. 3. Preferably, the construction is, as shown, such that the bolts 86 pass through notches 112 formed in the outer periphery of the spacing ring 111, and the channel or groove 110 is correspondingly notched, as at 113, to receive the clamping bolts.

The clamping ring or flange 116 is unlike the clamping ring 76 shown in Figure 3, in that the guiding shoulder 79 has been omitted, the laterally inner surface 117 of the clamping ring 116 being planar. The clamping ring 116, however, cooperates with the abutment shoulder 78 on the rim 63 in exactly the same manner as the clamping ring 76 cooperates with the shoulder 78 to limit the extent to which the rubber cushioning members can be compressed in a lateral direction.

The peripheral edges of the clamping rings 76 and 116 are beveled to accommodate the fillet between the groove 75 and the shoulder 78. As in the modifications described above, when the clamping bolts 86 are tightened the clamping ring 116 is drawn against the shoulder 78 and the spacer 111 is drawn against the shoulder 67, as a result of which and by virtue of the accurate dimensioning of these surfaces, the rubber cushioning members are subjected to uniform compression in a lateral direction.

The radial dimensions of the wheel discs 60 and 61 are sufficient to allow a certain amount of lateral flexibility, to permit assembling the wheel and bringing the various component parts to their proper position.

Figure 5:
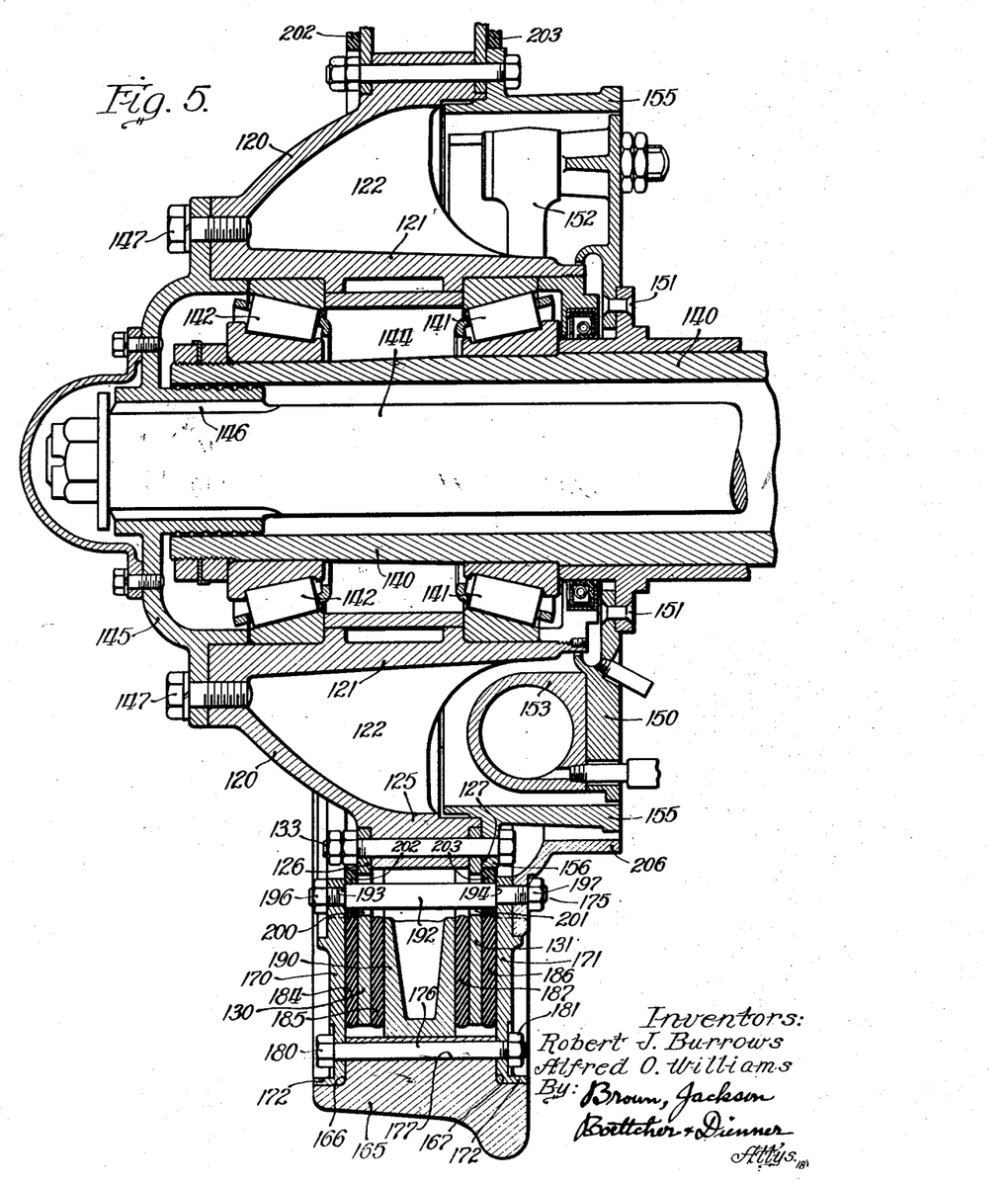
Figure 5 is another form of cushioned wheel in which the cushion rings or discs are clamped at both radially inner and outer points.

In Figure 5 we have shown a somewhat simplified construction which, in a number of respects, embodies certain advantages over the constructions described above. In the first place, the rim or tread of the wheel is of lighter construction since no radially inwardly integral flange is provided, as in the case of rims described above. In the second place, both flanges at opposite sides of the rim are separate therefrom and are somewhat lighter in weight than the corresponding flanges shown in the constructions illustrated in Figures 2, 3, and 4. This makes for a reduction in weight of this portion of the wheel, and this reduction is of considerable importance in that removing weight from the radially outer portions of the wheel reduces materially the kinetic energy stored in the wheel at high speeds. A light wheel makes for quicker acceleration and deceleration. In the third place, the separate clamping flanges or rings are fastened together by clamping bolts which are disposed both radially inwardly and radially outwardly of the cushioning rings. In this way, a uniform compression loading of the cushioning rings or discs is secured while employing relatively lightweight clamping rings. By virtue of this construction, it is possible to employ clamping rings or pressure plates which are formed of aluminum, thus further reducing the weight of the car wheel.

Referring now more particularly to Figure 5, the reference numeral 120 is a central wheel body including a hub portion 21 and reenforcing ribs 122 corresponding generally to the form of wheel 10 shown in Figure 2 and described above. The wheel body terminates in a shouldered drum section 125 having laterally spaced shoulders 126 and 127 receiving wheel discs 130 and 131 bolted to the shouldered drum section 125 by a row of bolts 133. These wheel discs 130 and 131 extend radially outwardly and have a limited amount of lateral flexibility and are otherwise of approximately the same construction as the wheel discs 5 and 6, and 60 and 61, described above.

The wheel body 120 is rotatably supported upon an axle housing 140 by taper bearings 141 and 142, and a driving axle or shaft 144, disposed within the axle housing 140, is operatively connected with the wheel by means of a driving flange 145 keyed, as at 146, to the driving axle and bolted, as at 147, to the wheel body 120. A brake support 150 is securely fixed, as by rivets 151, to the axle housing 140 and includes braking mechanism 152 and 153 of more or less conventional construction, operating in conjunction with a brake drum 155. The brake drum 155 includes a radially outwardly directed flange 156 which is provided with openings registering with the openings receiving the shoulder bolts 133. These shoulder bolts are then utilized as the means for securely fixing the brake drum 155 to the wheel body.

The rim or tread section of the wheel shown in Figure 5 is indicated by the reference numeral 165 and is formed with a pair of relatively deep grooves or recesses 166 and 167, one at each side of the rim. A pair of separable clamping flanges or pressure plates 170 and 171 are disposed in the grooves 166 and 167, respectively, and each of the pressure plates or clamping rings includes a laterally directed flange section 172 seating in the groove or recess of the rim.

The clamping rings are provided with a series of radially inwardly and radially outwardly disposed openings receiving two sets of clamping bolts, indicated respectively by the reference numerals 175 and 176. The outer series of clamping bolts pass through the outer openings in the clamping plates and through registering openings 177 formed in the inner portion of the rim 165.

The grooves 166 and 167 and the flanges 172 on the clamping rings are of such dimensions that the heads 180 and the nuts 181 on the bolts 176 are disposed within the laterally outer confines of the wheel. By virtue of this construction, there is no danger that the heads or nuts of the clamping bolts will be sheared off if the car should be derailed.

The inner series of clamping bolts 175 serves to rigidly connect the radially inner portions of the clamping rings 170 and 171 together and cooperates with the outer series of clamping bolts for applying uniform pressure to the cushioning rings 184 and 185, disposed on opposite sides of the wheel disc 130, and to the cushioning rings 186 and 187, disposed on opposite sides of the other wheel disc 131. A spacing member 190 is carried by the rim 165 between the inner cushioning rings 185 and 187 and is capable of lateral movement within the rim 165 when the pressure plates 170 and 171 are tightened on the rim.

The inner clamping bolts 175 are formed with an enlarged central section 192 providing opposite shoulders 193 and 194 against which the inner portions of the clamping plates 170 and 171 are adapted to bear. These shoulders 193 and 194 are accurately formed so as to be spaced apart exactly the same width as the shoulders formed by the grooves 166 and 167. This is for the purpose of insuring that when the inner and outer series of clamping bolts have been tightened, the cushioning rings will be under uniform compression. While the inner clamping bolts 175 have been shown in Figure 5 as including nuts 196 and 197 on each end thereof, it will be understood that the present invention also contemplates employing bolt means of conventional construction in connection with suitable tubular or cylindrical spacers providing shoulders or the like equivalent to the shoulders 193 and 194 described above. These shoulders and the shoulders provided by the grooves 166 and 167 provide stop means limiting the clamping movement of the pressure plates 170 and 171.

The cushioning rings 184, 185, 186, and 187 are disposed, as shown in Figure 5, on opposite sides of the circumferential portions of each of the wheel discs 130 and 131, and each of these wheel discs are capable of limited lateral flexibility so that the compression of the cushioning rings will be uniform. The cushioning rings transmit all radial loads imposed on the wheel by virtue of their strength in shear, and the shear is distributed equally throughout the mass of each and all of the cushioning rings. To accommodate the relative movement in a radial direction between the wheel body and the rim, the inner clamping bolts 175 are disposed in openings 200 and 201 in the wheel discs 130 and 131, which openings are larger than the diameter of the bolt sections 192.

In order to prevent dirt, dust, water and the like from getting into the inner portions of the wheel, the openings 200 and 201 in the wheel discs 130 and 131 are sealed by two soft rubber rings 202 and 203 perforated to receive the through bolts 192 and interposed between the outer faces of the discs 130 and 131 and the associated clamping flanges or pressure plates 170 and 171. These soft rubber rings 202 and 203 do not offer any material resistance to radial movement of the wheel body with respect to the rim, nor do the rings 202 and 203 prevent the clamping flanges 170 and 171 from applying the proper and uniform compression to the rubber discs 184, 185, 186, and 187.

The rings 202 and 203 extend entirely around the wheel and is the preferred construction, although it is possible to use rubber grommets or the like around each of the bolts 192 to close the openings 200 and 201.

Each of the pressure plates or clamping rings 171 is provided with a groove 205 to receive a collector ring 206. Preferably the latter is held in place against the shoulder 205 by the inner portion of the inner series of clamping bolts 175. This forms a convenient manner of supporting the collector ring 206 in electrical connection with the rail contacting rim or tread 165. In this connection, it is to be noted further that the brake drum 155 is not in direct connection with the rim 165, all braking stresses being transmitted to the rim through the cushioning rings 184, 185, 186, and 187 in shear. The collector ring 206 may be used in the manner set forth in the co-pending application of Alfred O. Williams, identified above.

While we have described above illustrative constructions in which the principles of the present invention are preferably embodied, it is to be understood that our invention is not to be limited to the specific means shown and described, but that, in fact, widely different means may be employed in the practice of the broader aspects of our invention.

What we claim, therefore, and desire to secure by Letters Patent, is:—

1. A wheel comprising a wheel body, a rim, a flange carried at one side thereof, a pair of spaced disc sections carried by said wheel body, a plurality of annular resilient members, one disposed on each side of both disc sections, said flange being disposed against one of the outer of said members, a second flange movably carried by the rim at the other side thereof and disposed against the other outer resilient member, means carried by the rim and disposed between the inner resilient members, and means also carried by the rim for forcing the flanges and said last named means up against the lateral faces of said resilient members whereby all radial loads imposed on the wheel are transmitted from the wheel body to the rim by said annular resilient members acting uniformly in shear.

2. A wheel comprising a central wheel body, a pair of axially spaced wheel discs connected with said wheel body, a rim member embracing said wheel discs and provided at each lateral edge with a radially inwardly extending flange disposed alongside the adjacent wheel disc, a spacer ring disposed between said wheel discs, said spacer ring, wheel discs and flanges presenting surfaces disposed in radial planes at right angles to the axis of the wheel, and a plurality of annular rubber discs disposed between the wheel discs and the spacer ring and flanges and acting uniformly in shear to transmit radial loads.

3. A resilient railroad car wheel comprising a central wheel body, a pair of axially spaced wheel discs secured to the wheel body, a rim embracing said discs and provided near one edge with a radially inwardly extending flange connected therewith and disposed adjacent one of said discs, an annular cushioning member disposed between said flange and the adjacent wheel disc, a central spacing member disposed between said wheel discs, an annular cushioning member disposed between said spacing member and the inner surface of each of said wheel discs, a second radially inwardly extending flange carried by the rim member and connected therewith adjacent the wheel disc opposite said first flange, an annular cushioning member disposed between said second flange and the adjacent wheel disc, and means for securing the lateral faces of the cushioning members to said spacing member and said flange, whereby all radial loads are supported by said cushioning members acting in shear.

4. A resilient railroad car wheel comprising a central wheel body having a pair of axially spaced wheel discs, at least one being removable, rim means embracing said discs and provided near one edge with a radially inwardly extending flange connected therewith and disposed adjacent one of said discs, an annular cushioning member disposed between said flange and the adjacent wheel disc, a central member disposed between said wheel discs and having bolt receiving openings formed therein, an annular cushioning member disposed against each side of said central member, a second radially inwardly extending flange carried by the rim means and connected therewith adjacent the wheel disc opposite said first flange, an annular cushioning member disposed between said second flange and the adjacent wheel disc, and bolt means passing through the openings in said central member and clamping said discs, flanges and central member against said cushioning members, whereby all radial loads are supported by said cushioning members acting in shear.

5. A wheel comprising a wheel body, a pair of wheels discs secured to the wheel body and at least one being of sufficient radial dimension to have a limited amount of flexibility laterally of the wheel, two pairs of cushioning members, one pair being disposed adjacent the lateral faces of each of said wheel discs near the outer peripheral portions thereof, a rim embracing said wheel discs and of a diameter larger than the outside diameters of said wheel discs, a spacer ring carried by the rim and disposed between the inner cushioning members, and means carried by the rim for clamping the cushioning members against the wheel discs and said spacer, thereby imposing compressive stresses on said members laterally of the wheel for yieldingly securing said rim to said wheel body.

6. A wheel comprising a wheel body, a pair of axially spaced wheel discs secured thereto, a rim encircling said discs but spaced radially outwardly thereof an amount to provide for relative shifting movement therebetween in the general plane of the wheel, a radially inwardly extending flange carried by said rim adjacent one edge thereof and disposed alongside one of said discs, a pair of annular rubber members, one disposed between said flange and said one wheel disc and one disposed on the opposite side of said wheel disc, a filler ring carried by said rim and disposed against the laterally inner one of said rubber members, a groove formed in said rim at the opposite edge thereof, a clamping flange movably carried in said groove at the opposite edge of said rim and having a flange portion extending radially inwardly alongside the other of said wheel discs, a second pair of annular rubber members, one disposed on each side of the said other wheel disc and against said filler ring and said flange portion, respectively, and bolt means passing through said rim flange and said clamping flange and operative to compress said pairs of annular rubber members against said wheel discs and the adjacent surfaces on said flanges and filler ring, said clamping flange cooperating with said groove to limit the maximum amount of lateral compression imposed on said annular rubber members.

7. A resilient railroad car wheel comprising a central wheel body, a pair of axially spaced wheel discs secured to the wheel body, a rim embracing said discs and provided near one edge with a radially inwardly extending flange disposed adjacent one of said discs, an annular rubber member disposed between said flange and the adjacent wheel disc, a central spacing member disposed between said wheel discs, an annular rubber member disposed between said spacing member and inner surface of each of said wheel discs, a clamping ring carried by the rim member adjacent the wheel disc opposite said flange, an annular rubber member disposed between the clamping ring and the adjacent wheel disc, and means for urging said clamping ring toward said flange, thereby compressing all of said annular rubber members against both sides of both of said wheel discs.

8. A wheel comprising a wheel body having its peripheral portion provided with a pair of axially spaced wheel discs lying in planes parallel with respect to the general plane of the wheel body, a rim member having radially inwardly extending flanges at the opposite edges thereof, said flanges being disposed adjacent to and on the outer sides of said wheel discs, at least one of said flanges being movable with respect to the rim, a plurality of annular rubber discs disposed on opposite sides of each of said wheel discs, a filler ring disposed between said wheel discs and the inner of said rubber discs, said filler ring being movable laterally with respect to the rim member when said movable flange is tightened to clamp the annular rubber discs against opposite faces of said wheel discs, and means for clamping the movable flange to said rim.

9. A wheel comprising a wheel body having its peripheral portion provided with a pair of axially spaced wheel discs lying in planes parallel with respect to the general plane of the wheel body, a rim member having radially inwardly extending flanges at the opposite edges thereof, said flanges being disposed adjacent and on the outer sides of said wheel discs and one of said flanges being movable with respect to the rim, a plurality of annular rubber discs disposed on opposite sides of each of said wheel discs, a filler ring disposed between said wheel discs and the inner of said rubber discs, said filler ring being movable with said rim member with respect to the wheel body and also movable laterally with respect to the rim member when said movable flange is tightened to clamp the annular rubber discs against opposite faces of said wheel discs, and means for clamping the movable flange to said rim.

10. A wheel comprising a wheel body, a pair of axially spaced wheel discs secured thereto, a rim encircling said discs but spaced radially outwardly thereof an amount to provide for relative shifting movement therebetween in the general plane of the wheel and provided adjacent one edge with a radially inwardly extending flange disposed alongside one of said discs, and a shouldered section disposed adjacent said flange and radially outwardly of the adjacent wheel disc, a pair of annular rubber members, one disposed between said flange and said one wheel disc and one disposed on the opposite side of said wheel disc, a filler ring disposed against said shouldered section and the laterally inner one of said rubber members, a clamping flange carried at the opposite edge of said rim and having a guiding shoulder and a flange portion extending radially inwardly alongside the other of said wheel discs, a second pair of annular rubber members, one disposed on each side of the said other wheel disc and against said filler ring and said flange portion, respectively, and bolt means passing through said rim flange and said clamping flange and operative to compress said pairs of annular rubber members against said wheel discs and the adjacent surfaces on said flanges and filler ring.

11. A wheel comprising a wheel body, a pair of axially spaced wheel discs secured thereto, a rim encircling said discs but spaced radially outwardly thereof an amount to provide for relative shifting movement therebetween in the general plane of the wheel, a radially inwardly extending flange carried by the rim adjacent one edge thereof and disposed alongside one of said discs, a pair of annular rubber members, one disposed between said flange and said one wheel discs and one disposed on the opposite side of said wheel disc, a shoulder formed on said rim radially outwardly of said last named rubber member, a filler ring disposed against said shoulder and said last named rubber member, a second flange carried at the opposite edge of said rim and having an abutment portion adapted to engage the side of said filler ring opposite the shoulder on the rim, and a flange portion extending radially inwardly alongside the other of said wheel discs, a second pair of annular rubber members, one disposed on each side of the said other wheel disc and against said filler ring and said flange portion, respectively, and bolt means passing through said flanges and said filler ring and operative to compress said pairs of annular rubber members against said wheel discs and the adjacent surfaces on said flanges and filler ring, said filler ring cooperating with said shoulder and said abutment portion to limit the maximum amount of lateral compression imposed on said annular rubber members.

12. A wheel comprising a wheel body, a plurality of annular resilient members, one disposed on each side of the circumferential portion of said wheel body, a rim embracing the wheel body and spaced radially outwardly from the peripheral portions thereof, a pair of flanges bolted to opposite sides of and attached to said rim and serving to secure said resilient members against the circumferential portion of the wheel body whereby all radial loads imposed on the wheel are transmitted by the strength of the resilient members in shear, means rigidly connecting the radially inner portions of said flanges together, and means associated with said last named connecting means for sealing the space between the innermost portions of said flanges and the adjacent circumferential portion of the wheel body.

13. A resilient railroad car wheel comprising a central wheel body, a plurality of axially spaced wheel discs secured to the wheel body, a rim embracing said discs and having grooves at the edges thereof, spacer means disposed between said wheel discs, said spacer means and wheel discs presenting surfaces disposed in radial planes at right angles to the axis of the wheel, a plurality of annular cushioning discs, one being disposed on each side of each of said wheel discs in lateral contact therewith and with said spacer means, a pair of clamping rings carried by said rim and bearing laterally against the outer faces of the outer cushioning discs, said camping rings being seated in the grooves at the edges of said rim, and means comprising radially inwardly and outwardly disposed series of clamping members engaging said clamping rings for applying uniform lateral pressure to said cushioning discs, whereby all loads imposed on the wheel are transmitted by said cushioning discs acting in shear, the ends of said members terminating within the grooves of said rim and protected thereby.

14. A wheel comprising a wheel body, a pair of axially spaced wheel discs secured thereto, a rim encircling said discs but spaced radially outwardly thereof an amount to provide for relative shifting movement therebetween in the general plane of the wheel and provided adjacent one edge with a radially inwardly extending flange disposed alongside one of said discs, a pair of annular resilient members, one disposed between said flange and said one wheel disc and one disposed on the opposite side of said wheel disc, a filler ring carried by the rim and disposed against the laterally inner one of said resilient members, a second flange carried at the opposite edge of said rim and having a portion extending radially inwardly alongside the other of said wheel discs, a second pair of annular resilient members, one disposed on each side of the said other wheel disc and against said filler ring and said flange portion, respectively, and means reacting against said rim and said flanges and operative to compress said pairs of annular resilient members against said wheel discs and the adjacent surfaces on said flanges and filler ring.

15. A wheel comprising a central wheel body, a pair of axially spaced wheel discs connected with said wheel body, a rim member embracing said wheel discs and provided at each lateral edge with a radially inwardly extending flange disposed alongside the adjacent wheel disc, a spacer ring axially movable and disposed between said wheel discs, said spacer ring, wheel discs and flanges presenting surfaces disposed in radial planes at right angles to the axis of the wheel, a plurality of annular resilient discs disposed between the wheel discs and the spacer ring and flanges and acting uniformly in shear to transmit radial loads, and means carried by the rim for clamping the flanges against said resilient discs to compress the same laterally against said spacer ring and flanges.

16. A wheel comprising a wheel body, a plurality of annular resilient members, one disposed on each side of the circumferential portion of said wheel body, a rim embracing the wheel body and spaced radially outwardly from the peripheral portions thereof, a pair of flanges bolted to opposite sides of and attached to said rim and serving to secure said resilient members against the circumferential portion of the wheel body whereby all radial loads imposed on the wheel are transmitted by the strength of the resilient members in shear, means rigidly connecting the radially inner portions of said flanges together, and means for sealing the space between the radially innermost portions of said flanges and the adjacent portions of the wheel body.

17. A wheel comprising a wheel body, a plurality of annular resilient members, one disposed on each side of the circumferential portion of said wheel body, a rim embracing the wheel body and spaced radially outwardly from the peripheral portions thereof, a pair of flanges bolted to opposite sides of and attached to said rim and serving to secure said resilient members against the circumferential portion of the wheel body whereby all radial loads imposed on the wheel are transmitted by the strength of the resilient members in shear, said flanges extending radially inwardly beyond said resilient members, and means rigidly connecting the radially inner portions of said flanges together, and sealing means disposed between said radially inwardly extending portions of the flanges and the adjacent portions of the circumferential portion of the wheel body and disposed in the plane of said resilient members for sealing the space between the radially innermost portions of said flanges and the adjacent portions of the wheel body.

18. A wheel comprising a wheel body, a plurality of annular resilient members, one disposed on each side of the circumferential portion of said wheel body, a pair of axially spaced discs secured to said circumferential portion of the wheel body, a rim embracing said discs and spaced radially outwardly from the peripheral portions thereof, a pair of flanges bolted to opposite sides of and attached to said rim and serving to secure said resilient members against the circumferential portion of the axially spaced discs, whereby all radial loads imposed on the wheel are transmitted by the strength of the resilient members in shear, said flanges extending radially inwardly beyond said resilient members, enlarged openings formed in said discs adjacent their connection with the wheel body and the radially inwardly extended portions of said flanges, bolt means carried by the latter and passing through said openings rigidly connecting the radially inner portions of said flanges together, and means for sealing the space between the radially innermost portions of said flanges and the adjacent portions of the wheel body discs surrounding said enlarged openings.

19. A resilient wheel comprising a central wheel body having a wheel disc receiving groove, a wheel disc seated therein and disposed at one side of the wheel, a second wheel disc carried by said wheel body and disposed at the other side of the wheel body, rim means embracing said discs and provided near one edge with a radially inwardly extending flange connected therewith and disposed adjacent one of said discs, an annular cushioning member disposed between said flange and the adjacent wheel disc, a central member disposed between said wheel discs when the wheel is assembled, an annular cushioning member disposed against each side of said central member, a second radially inwardly extending flange carried by the rim means and connected therewith adjacent the wheel disc opposite said first flange, an annular cushioning member disposed between said second flange and the adjacent wheel disc, and bolt means securing said first wheel disc in said groove and clamping said cushioning members against said discs, flanges and central member, whereby all radial loads are supported by said cushioning members acting in shear.

20. A resilient wheel including a wheel body having an outwardly directed channel-shaped portion, resilient cushioning discs engaging opposite faces of each leg of said channel-shaped portion, a rim having radially inwardly extending surfaces engaging the free lateral surfaces of said cushioning discs, and means for shifting certain of said rim surfaces with respect to each other whereby said discs are uniformly compressed to transmit all radial loads to said wheel body.

21. In combination, a wheel body having radially directed circumferential discs, a rim member having a pair of spaced radial inwardly directed channels, resilient cushioning members between the radial surfaces of said discs and channels, said channels each having one radial surface thereof laterally shiftable with respect to the other, and fastening means for simultaneously shifting both said shiftable surfaces to place all said cushioning members under uniform lateral compression.

22. A resilient wheel comprising a wheel body having spaced radially extending discs, a rim member having a radial inwardly directed flange at one lateral edge, a plate extending radially inwardly from the opposite lateral edge, an inwardly directed channel shaped member intermediate said edges, and resilient members compressed against opposite surfaces of said discs by said flange, plate and the external sides of said channel.

ROBERT J. BURROWS.
ALFRED O. WILLIAMS.